United States Patent [19]

Kvistgaard

[11] Patent Number: 5,085,279
[45] Date of Patent: Feb. 4, 1992

[54] LIFTER FOR POTATOES AND OTHER SUBTERRANEAN VEGETATION PRODUCTS

[76] Inventor: Jens P. Kvistgaard, Hestbækvej 31, Linde, Holstebro, Denmark

[21] Appl. No.: 352,124

[22] Filed: May 12, 1989

Related U.S. Application Data

[63] Continuation of Ser. No. 89,820, Aug. 27, 1987, abandoned, which is a continuation of Ser. No. 795,350, Oct. 29, 1985, abandoned.

[30] Foreign Application Priority Data

Feb. 29, 1984 [DK] Denmark .............................. 1260/84
Feb. 27, 1985 [DK] Denmark ........ PCT/DK85/00016

[51] Int. Cl.⁵ ............................................ A01D 17/00
[52] U.S. Cl. ...................................... 171/4; 171/120; 171/131; 171/132
[58] Field of Search .................... 171/4, 101, 104, 105, 171/120, 131, 132, 133, 71, 74

[56] References Cited

U.S. PATENT DOCUMENTS

| 101,499 | 4/1870 | Patterson . | |
|---|---|---|---|
| 155,215 | 9/1874 | Aspinwall . | |
| 408,208 | 8/1889 | Burger . | |
| 786,792 | 4/1905 | Alstock . | |
| 1,864,484 | 6/1932 | Currie | 171/133 X |
| 2,452,418 | 10/1948 | Zuckerman | 171/120 X |
| 2,617,347 | 11/1952 | Provost . | |
| 2,758,528 | 8/1956 | Hulverson . | |
| 2,921,637 | 1/1960 | Danielsson | 171/101 |
| 3,184,029 | 5/1965 | Loosli | 171/133 X |
| 3,627,051 | 12/1971 | Schmitz et al. . | |
| 3,654,997 | 4/1972 | Partyanko et al. . | |
| 4,541,491 | 9/1985 | Van Der Lely . | |

FOREIGN PATENT DOCUMENTS

| 504302 | 7/1951 | Belgium | 171/133 |
|---|---|---|---|
| 3006 | 4/1900 | Denmark . | |
| 57342 | 3/1940 | Denmark | 171/120 |
| 95173 | 3/1897 | Fed. Rep. of Germany . | |
| 830259 | 1/1952 | Fed. Rep. of Germany . | |
| 607898 | 7/1926 | France . | |
| 57088 | 10/1952 | France | 171/133 |
| 17391 | 6/1927 | Netherlands . | |
| 6909 | 4/1898 | Norway . | |
| 967344 | 10/1982 | U.S.S.R. | 171/131 |
| 676239 | 7/1952 | United Kingdom . | |
| 1425663 | 2/1976 | United Kingdom . | |
| 2067434 | 7/1981 | United Kingdom . | |

Primary Examiner—Dennis L. Taylor
Assistant Examiner—Jeffrey L. Thompson
Attorney, Agent, or Firm—Antonelli, Terry Stout & Kraus

[57] ABSTRACT

A potato lifter, but also being a lifter capable of lifting other especially subterranean vegetation products, such as celery roots, carrots, bulbs, edible onions, etc., the lifter being of the kind comprising an in the ground, under the products, led cutting member and a conveyor positioned behind the cutting member for the upwards guiding of the products is described. A number, and at least one, mainly with plain, smooth or comparatively featureless surface shaped delivery roll or rolls (5, 6, 7, 8) is (are) positioned between the rear edge of the cutting member(1, 2, 3, 4) and the conveyor (9). The delivery rolls, having preferably equal diameters and being driven with a circumference velocity of about the same size as the forward drive velocity of the potato lifter, are positioned rotatable around mainly horizontal axes and, when more than one, positioned rather close together and mutually parallel. The damage introduced at the mechanical lifting to the potatoes is exquisitely low.

15 Claims, 4 Drawing Sheets

LIFTER FOR POTATOES AND OTHER SUBTERRANEAN VEGETATION PRODUCTS

This is a continuation of application Ser. No. 089,820, filed Aug. 27, 1987, which in turn is a continuation of Ser. No. 795,350, filed Oct. 29, 1985, both applications now abandoned.

BACKGROUND OF THE INVENTION

The present invention relates to a lifter for lifting subterranean, vegetation products, such as, for example, potatoes, celery roots, carrots, bulbs, edible onions, etc., with the lifter comprising an in ground, under the products, driven cutting member and a conveyor positioned behind the cutting member for upwardly guiding the vegetation products.

A lifter of the aforementioned type may be used just to lift the vegetation products such as potatoes from the underground and lay the same on the ground or to lift the potatoes from there or directly from underground to a silo member and directly to a further preparing apparatus or device.

A disadvantage of conventional lifters resides in the fact that a certain percentage of the lifted potatoes are bruised or directly damaged thereby resulting in a loss of weight of the damaged potatoes during storage. Bruised potatoes having bruise marks, aside from not presenting an appealing appearance also result in a larger waste when peeled. An additional expense is also incurred when the stored potatoes are sprayed to protect the damaged potatoes against attacks from, for example, fungi.

The aim underlying the present invention essentially resides in providing a lifter which not only is as efficient as conventional harvesters but also reduces the amount of damage to the vegetation products being harvested.

In accordance with this present invention, a drive mechanism is provided which is capable of driving the moving parts of the potato lifter to achieve an optimum performance of the lifter.

Advantageously, in accordance with the present invention, a lifter is provided for lifting subterranean vegetation products such as, for example, potatoes, celery roots, carrots, bulbs, edible onions, etc., with the lifter including an in ground under the products driven cutting member and a conveyor positioned behind the cutting member for an upward guiding of the products. At least one substantially plain smooth surface delivery roll is provided and positioned between a rear edge of the cutting member and the conveyor.

In accordance with further features of the present invention, the delivery rollers are rotatably positioned about a substantially horizontal axis and are disposed in close proximity to each other and mutually parallel.

The delivery rolls are, in accordance with the present invention, driven by a drive means from at least one lifter supporting wheel through a gear transmission means, preferably being driven with such a velocity that the circumference of the delivery rolls is such that the foremost of the delivery rolls rotates with a circumferential velocity which is slightly greater than a monetary drive velocity of the potato lifter over the ground, and a rear most of the delivery rolls has the greatest circumferential velocity, with the delivery rolls between the first or foremost delivery roll and last delivery roll respectively having increasing higher circumferential velocities in proportion to the preceding delivery roll.

In accordance with the present invention, all of the delivery rolls have the same outer diameter and lengths of the delivery rolls are such that they extend from side to side within the lifter and corresponds to a width of the ribbon of earth being treated by the lifter.

Additionally, in accordance with the present invention, over at least a portion of the delivery rolls, an aiding or assisting conveyor carrying protruding and, preferably, yielding spikes is provided, whereby a lower side of the aiding conveyor, facing the delivery rolls, serves as an accompanying conveyor for the lifted products.

In accordance with still further features of the present invention, supporting means are provided for the aiding conveyor and are adjustable so as to provide for a predetermined spacing between the aiding conveyor and the delivery rolls.

Advantageously, the working surface of the conveyor disposed downstream of the delivery rolls in proportion to the upper conveying surface of the delivery rolls is situated relatively lower, respectively, that the level difference therebetween is adjustable by adjustable means.

By virtue of the provision of a vegetation products lifter in accordance with the present invention a surprisingly effective handling of vegetation products such as, for example, potatoes is attained. This is true even when lifting the potato up from the underground, as lifting them up from the surface of the ground after they by the same machine or by other means have been removed from underground and lay free on the surface of the ground for a suitable time period, as a part of preparing process, depending on the type of potatoes and local conditions, to let the potatoes be exposed to the surrounding free atmosphere before they are finally lifted by the potato lifter for storing in, for example, a silo or for further preparation. By lifting directly from the surface of the ground, it is advantageous to employ an upper aiding conveyor positioned above the delivery rollers, as the handling of the potatoes then is even more careful. Such an upper aiding conveyor is not utilized when lifting the potatoes from the underground. The addition of the aiding conveyor is thus an optional means which becomes operational when lifting potatoes directly from the ground.

Even the provision of a single delivery roll according to the invention introduces a positive effect. Generally three or four such delivery rollers positioned in parallel between the cutting member and a usually employed conveyor for the further transportation of the potatoes may be considered as an optimal combination.

Actual use of the lifter of the present invention has established a very considerable reduction of the percentage of damaged potatoes when compared with conventional lifters by, for example, a factor of reduction by 3 to 10 times. This applies in case of light as well as of heavy earth substance also when the potatoes are removed from a weedy ground surface. Moreover, the lifter is capable of being more successfully operated in a rain soaked soil than conventional harvesters. The lifter of the present invention is also capable of being successfully operated at a higher drive speed than conventional lifters.

The delivery rolls according to the present invention are advantageously arranged to be driven at different rotational speeds, with the speed of rotation being highest for the delivery rolls positioned farthest behind the cutting member. Hereby partly it is attained that, for example, small stones, lifted together with potatoes, are less apt to be stuck between the delivery rolls, which delivery rolls are substantially disposed in a mutually parallel position with a rotational axis thereof being disposed perpendicular to the drive direction of the lifter. For the use at very sloped fields the orientation of the rolls within the lifter may be adjustable, respectively, so that each delivery roll is divided into groups of, for example, three rolls, the axes of which are adjustable within a plane rectangular to the drive direction of the lifter. The delivery rolls within the lifter advantageously have the same external diameter, and a rotational speed of the rearmost delivery roll is 5 to 10% greater than a foremost delivery roll.

A forerunning guide wheel with side members to run on both sides of a row of growing potatoes, serving to guide the cutting member and the potato lifter, may advantageously also be employed at the lifter according to the invention.

The above and other objects, features, and advantages of the present invention will become more apparent from the following description when taken in connection with the accompanying drawings which show, for the purposes of illustration only, one embodiment in accordance with the present invention.

DETAILED DESCRIPTION

Figure 1:
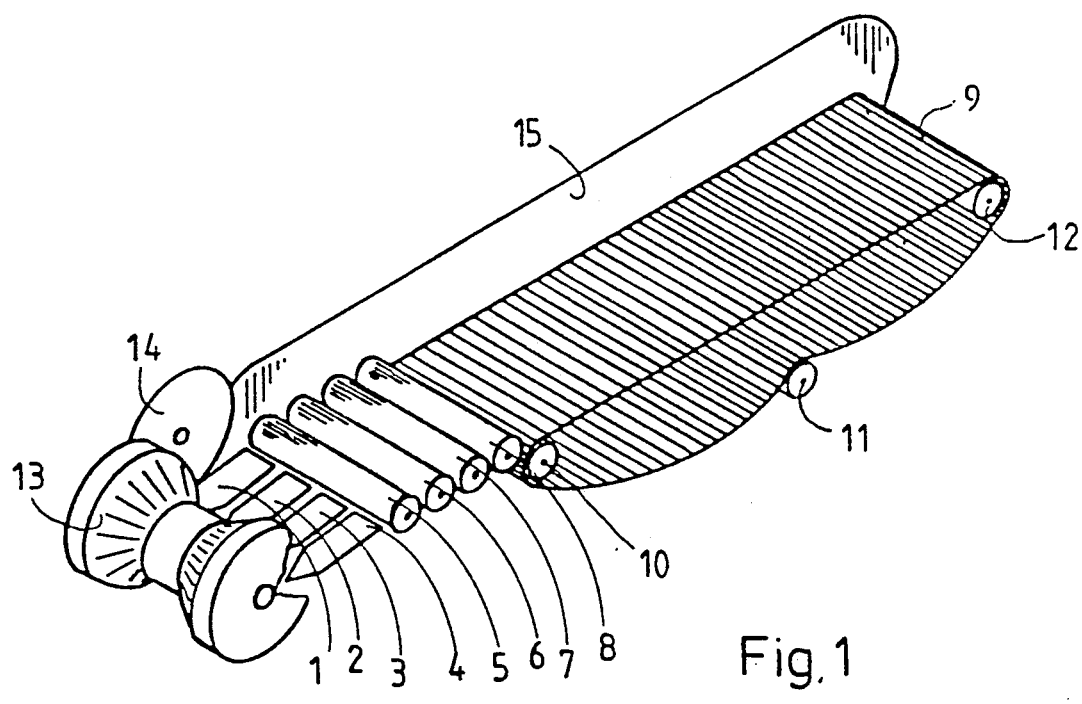
FIG. 1 is a perspective view of an embodiment of a vegetation products lifter according to the present invention.

Referring now to the drawings wherein like reference numerals are used throughout the various views to designate like parts and, more particularly, to FIG. 1, according to this figure, a vegetation products lifter is provided which includes forwardly extended pointed earth cutting or unearthing members 1, 2, 3, 4, adapted to be lead or driven under the vegetation products such as, for example, potatoes, to be lifted or removed from the ground. The potatoes together with the ground around them are pressed upwardly along an upper surface of the cutting or unearthing members 1-4 when the potato lifter is driven forwardly, that is, to the left of FIG. 1. A guide wheel 13 lies against a top of a row or growing potatoes and means are provided for enabling an adjustment of a spacing between the guide wheel and the cutting members so as to determine a depth of penetration into the ground by the cutting members 1-4. A cutting wheel 14 is positioned adjacent the earth cutting members 1-4, and another cutting wheel (not shown) is positioned at the other side of the earth cutting member 4. The cutting wheels laterally cut a ribbon of earth which is continuously lifted by the lifter.

A conveyor 9 is disposed rearwardly of the earth cutting members 1-4, with a conveyor 9 being supported, for example, by supporting and drive rolls 10, 11 and 12. The conveyor 9 comprises a plurality of parallel rods positioned suitably close together so that the earth may fall down to the ground whereas the potatoes are further guided thereby. The conveyor 9 may have a free end so that the potatoes fall down on the surface of the ground, and after a suitable time period are picked up by the lifter for further processing in an apparatus following the lifter or transported by other means to a storage area or for further treatment.

When the delivery rolls 5, 6, 7, 8 with plain, smooth or comparatively featureless surface are respectively positioned between the rear edge of the earth cutting members 1, 2, 3, 4 and the front end of the conveyor 9, which preferably is positioned some what lower than the last of the delivery rolls 8, a remarkable improvement is obtained compared to the known harvesters since fewer potatoes are damaged by the lifter even when running faster over the ground than conventional harvesters.

A slide plate 15 or a plate formed on chassis portions of the lifter forms one of the sides of the lifter and prevents the potatoes from being laterally discharged and simultaneously serves as a support means. On the other side of the lifter a corresponding side plate arrangement (not shown) is provided.

Figure 2:
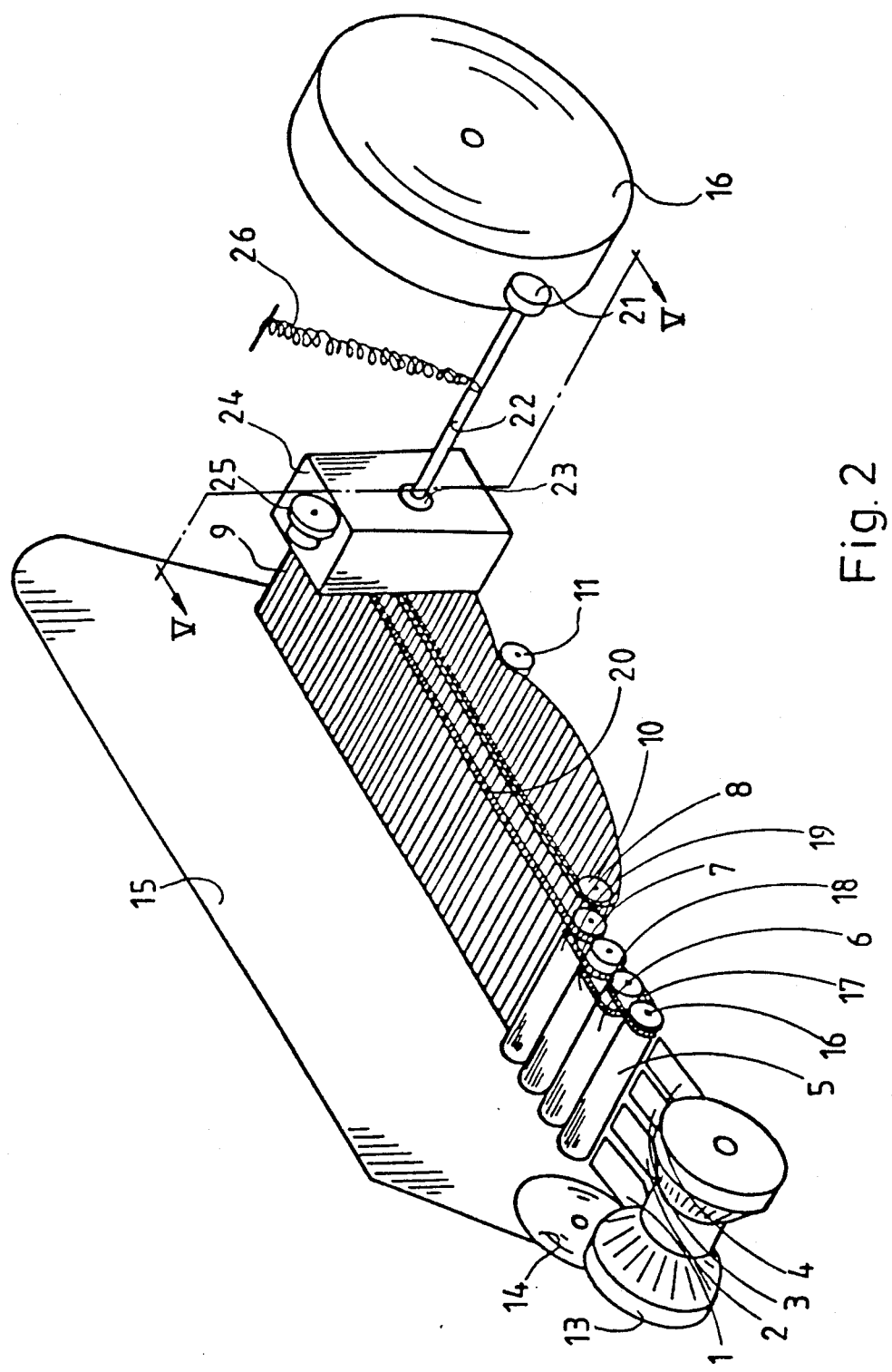
FIG. 2 is a perspective view of the vegetation products lifter of FIG. 1 with a drive means for delivery rolls thereof.

As shown in FIG. 2, a mechanism for the delivery rolls 5, 6, 7, 8 includes a hydraulic or oil pressure motor 25, positioned on top of a gearbox 24, for driving gear ratio member in the gearbox 24 thereby driving a shaft 22 through a coupling 23. A friction wheel 21 on the shaft 22 rests against the foremost side of a wheel 16 taking part in carrying the lifter. The drive speed of the circumference of the friction wheel 21 corresponds to the drive speed of the lifter on the ground. A spring 26 biases the shaft 22 and friction wheel 21 in an upward direction. If the motor 25 is driven fast enough, the friction wheel 21 runs at a higher position on the wheel 16 and, in case of a sufficiently large upward lifting, becomes totally free of the wheel 16. Through a suitable drive ratio in the gearbox 24 the friction wheel 21 is able directly to drive a chain 20 from a sprocket (not shown) and the friction wheel 21, through chain 22, influences the motor 25 so that the drive power of the motor 25 is reduced if the friction wheel 21 has been raised too much. Hereby it is attained that the chain 20 is driven with a speed which is linearily proportional with the forward moving speed of the lifter. A sprocket on the delivery roll 8 is driven by chain 20. A further sprocket connected with delivery roll 8 drives a chain 19 which, through a sprocket (not shown) drives the delivery roll 7, which through a chain 18 and two sprockets drives the delivery roll 6, which through a chain 17 and two further sprockets (not shown) drives delivery roll 5. The sprockets could be provided with an equal amount of teeth, whereby all the delivery rolls 5-8 are running at the same speed. But if the driving sprockets on delivery rolls 8, 7, 6 and 5 have, for example, 16, 17, 18 and 19 teeth, a different rotational speed of the delivery rolls 5-8 is obtained. Good result may be obtained with a circumferential velocity of the foremost delivery roll 5 being equal to a forward velocity of the lifter plus 10 percent.

Figure 3:
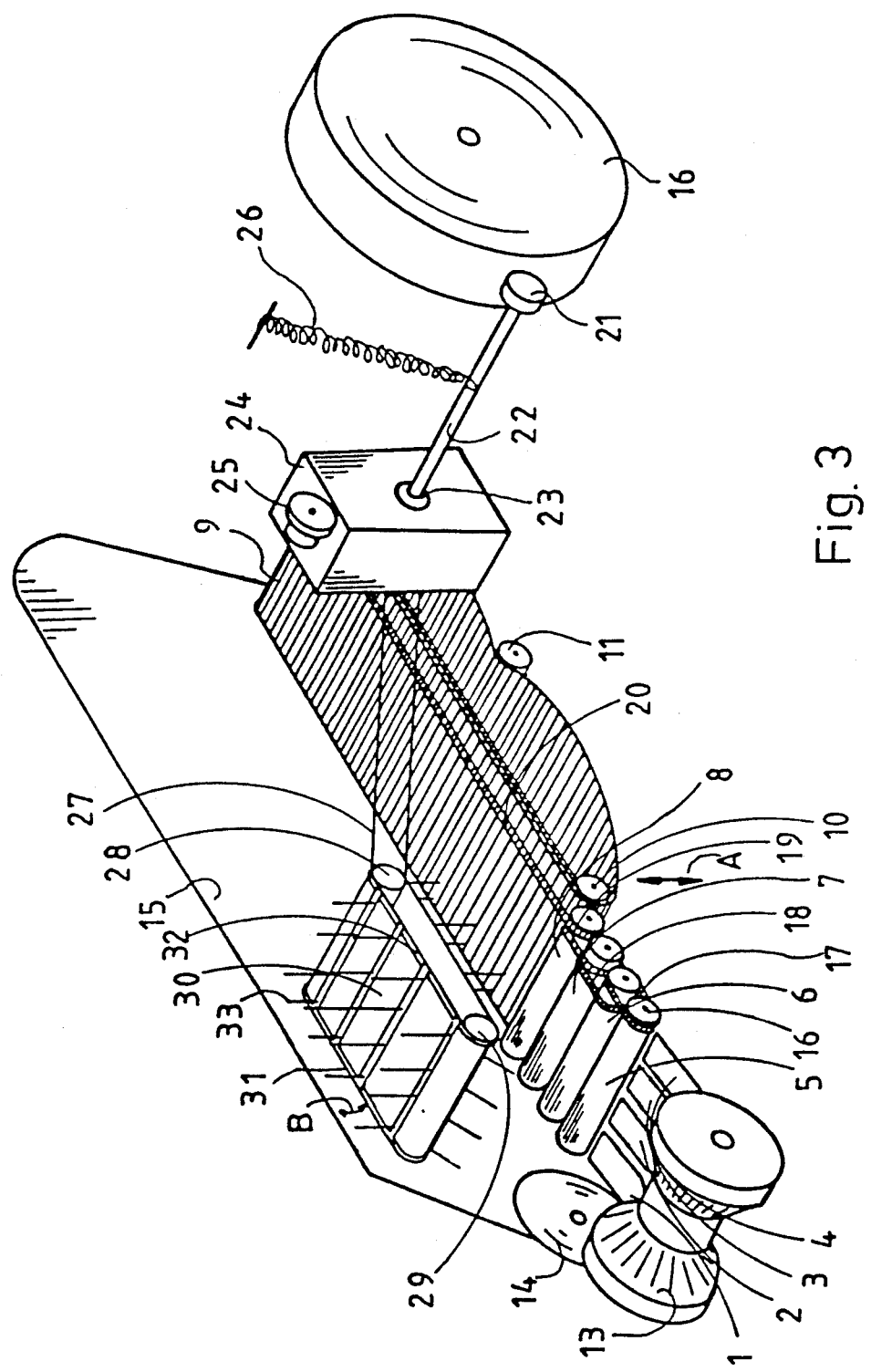
FIG. 3 is a perspective view of the vegetation products delivery rolls.

As shown in FIG. 3, an aiding conveyor 30 is provided and includes protruding spikes 33 disposed on traverse rods connected to belts 31 and 32 of the conveyor with the conveyor 30 being driven by wheels or rolls 28, 29, the rearmost of which is driven through a chain 27 which may be driven through the same drive mechanism as used for the delivery rolls 5, 6, 7, 8 so as to achieve synchronism therewith.

Both conveyors 30 and 9 may each be supported by pivotable frames directly or indirectly through pivotable or swinging link suspension means connected with the side plates 15, so that the front end spacing to the top of the delivery rolls 5, 6, 7, 8 is adjustable. If the swinging link suspension is fashioned as a parallelogram the position of the conveyor or conveyors may be adjustable, in a known manner in the direction of the arrows A and B (FIG. 3). With suitable conventional fastening members a chosen position may be maintained until a readadjustment is necessary, with the adjustment being remote controlled through the insertion of, for example, one or more hydraulic operated cylinder piston units.

Figure 4:
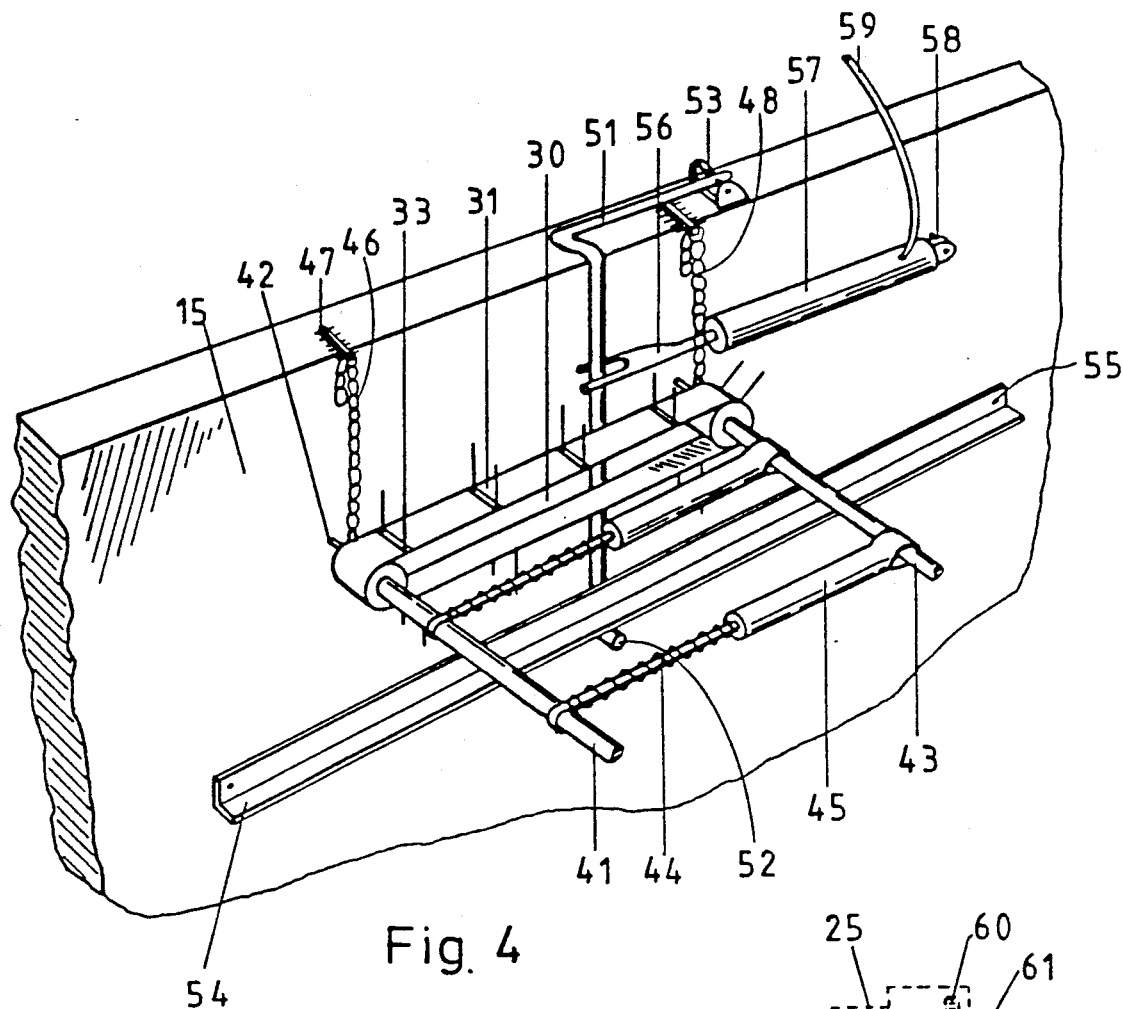
FIG. 4 is a perspective view of the aiding conveyor of FIG. 3.

As shown in FIG. 4, the aiding conveyor 30 includes a front shaft 41 carrying a sprocket 29 (FIG. 3) on protruding ends of the shaft 41 which, for example, stop-bushings (not shown) suspended in chains 46 of which only one is illustrated in the drawings. The upper ends of the chains are formed in a hook shape and, for example, are welded to the side plates 15 through fastening members 47. Corresponding chains 48 are arranged at the rear shaft 43 carrying the sprocket 28 (FIG. 3). Tightening members 44, 45 for the tightening of the belts 31, 32, of which only 31 is shown in FIG. 4, may be positioned between the shafts 41, 43 and may comprise an external spring means on a piston means 44 cooperating with a cylinder means 45.

An angle shaped rail 54 which may, for example, mechanically cooperate with a corresponding angle shaped rail at the opposite side of the lifter are supported as shown at 55. The angle shaped rails are able to grip the shaft ends such as 42 from below and simultaneously lift the conveyor 30 upwards so that it at later use after lowering may be reused with unaltered operational position of the conveyor inside the potato lifter. For example, a manually activatable fastening member may be provided to maintain conveyor in a position determined by the angle shaped rails. A remote controlled lifting and lowering by the angle shaped rails may include a bent arm 51 with a gripping means 52 gripping the rails and a hydraulic drive cylinder 57 or other drive means pivotably supported at 58 to the side plates 15. The cylinder 57 comprises a piston means 56 and a control hose 59 for supplying hydraulic fluid.

Figure 5:
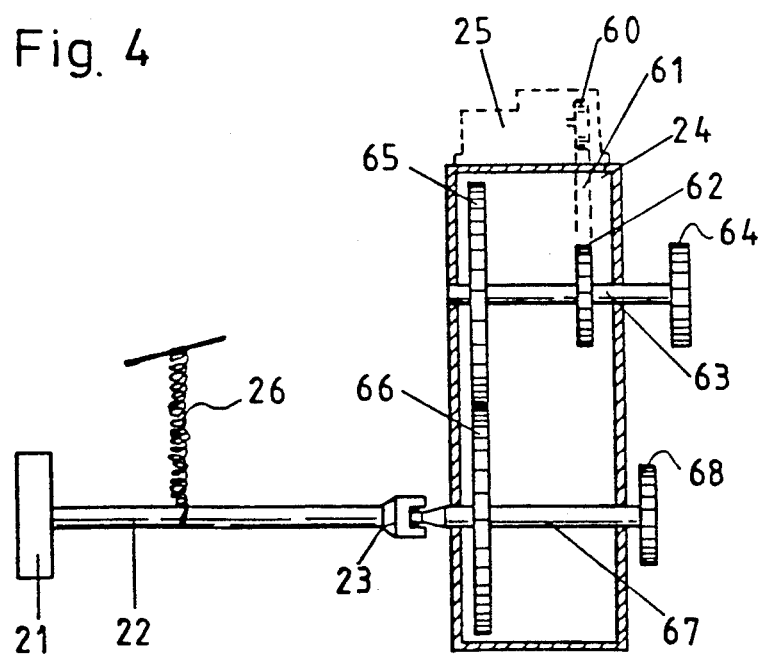
FIG. 5 is a cross-sectional view taken along the line V—V in FIG. 2.

As shown in FIG. 5, the gearbox 24 includes a drive wheel 60 connected, in a conventional manner, to, for example, a drive wheel arranged on a shaft 63 carrying a sprocket for chain 27 which drives the aiding conveyor 30. Through gear wheels 65, 66, a shaft 67, carrying a sprocket 68 for the driving of chain 20, driving the delivery rolls 5, 6, 7, 8, is rotated in a opposite direction. The sprockets 64 and 688 drive the friction wheel 21 when the motor 25 receives no drive energy producing means or the supply hereof is too low, whereas, the friction wheel 21 is raised to reduce the grip in the wheel 16 when sufficient supply is present to the motor 25. By means of cardan shaft 23, and when a large angle is formed between the shafts 67 and 22, a certain uneven drive velocity of the delivery rolls 5, 6, 7, 8 advantageously can be provided.

As can readily be appreciated, the cutting members 1, 2, 3, and 4 may be fashioned as a single cutting member.

I claim:

1. A lifter for lifting subterranean vegetation products, the lifter comprising supporting wheel means for supporting the lifter, unearthing means adapted to be inserted under the vegetation products for cutting a ribbon of earth containing subterranean vegetation products to be lifted by the lifter, an endless moving conveyor means positioned behind the unearthing means for receiving the ribbon of earth containing subterranean vegetation products and upwardly guiding the lifted vegetation products, said conveyor means having a structure which permits earth to fall down through the conveyor means to the ground while upwardly conveying the vegetation products, more than one delivery roll means, each having a smooth cylindrical outer surface, disposed from a rear edge of the unearthing means to a front edge of the conveyor means, said delivery roll means being parallel to one another and all located in rather close proximity to one another for delivering vegetation products and earth from the unearthing means to the conveyor means, and drive means for rotationally driving at least one of said delivery roll means.

2. A lifter according to claim 1, wherein said delivery roll means are each rotatably positioned about a substantially horizontal axis when the lifter is in a working position.

3. A lifter according to claim 1, further comprising means for controlling the rotational speed of the at least one, delivery roll means driven by said drive means.

4. A lifter according to claim 3, wherein said means for controlling the rotational speed comprises gear transmission means interposed between said at least one delivery roll means and said drive means.

5. A lifter according to claim 1, wherein said drive means comprises a motor.

6. A lifter according to claim 1, wherein said drive means is adapted to drive each of said delivery roll means at the same rotational speed.

7. A lifter according to claim 1, wherein said drive means is adapted to drive a plurality of said delivery roll means in such a manner that a rotational speed of the delivery roll means adjacent the unearthing means is less than a rotational speed of the delivery roll means adjacent a front edge of the conveyor means.

8. A lifter according to claim 7, wherein a rotational speed of the delivery roll means between the delivery roll means at the rear edge of the unearthing means the delivery roll means at the front edge of the conveyor means proportionally increase in a direction toward the front edge of the conveyor means.

9. A lifter according to one of claims 6, 7 or 8, wherein means are provided for rotatably supporting said delivery roll means about substantially horizontal axes, and wherein each of said delivery roll means has substantially the same diameter.

10. A lifter according to one of claims 6, 7 or 8, wherein a length of said delivery roll means is set so as to extend from side to side of the lifter and to correspond to a width of the ground being treated.

11. A lifter according to claims 6, 7, or 8, wherein means are provided for rotatably supporting said delivery roll means about substantially horizontally extending axes, each of said delivery roll means has substantially the same diameter, and wherein a length of said delivery roll means is such so as to extend from side to side of the lifter and correspond to a width of the ground being treated.

12. A lifter for lifting subterranean vegetation products, the lifter comprising unearthing means adapted to be inserted under the vegetation product, an endless moving conveyor means positioned behind the unearthing means for upwardly guiding the vegetation products while permitting earth to fall therethrough to the ground, more than one delivery roll means, each having a smooth cylindrical outer surface, the roll means being all located in rather close proximity to one another and disposed from a rear edge of the unearthing means to a front edge of the conveyor means for conveying vegetation products and earth from the unearthing means to the conveyor means, means for driving at least one delivery roll means, a further conveyor means extending over at least a portion of the delivery roll means, said further conveyor means cooperating with said delivery roll means to assist in conveying the vegetation products.

13. A lifter according to claim 12, wherein a plurality of delivery roll means are provided and are disposed in close proximity and in parallel to each other.

14. A lifter according to claim 13, wherein said further conveyor means includes a plurality of means for conveying the vegetation products.

15. A lifter according to one of claims 13 or 14, wherein means are provided for adjusting a space in between the delivery roll means and the further conveyor means.

* * * * *